United States Patent
Seelos

(10) Patent No.: US 10,066,772 B2
(45) Date of Patent: Sep. 4, 2018

(54) HOSE CLAMP

(71) Applicant: OETIKER SCHWEIZ AG, Horgen (CH)

(72) Inventor: Robert Seelos, Rüschlikon (CH)

(73) Assignee: OETIKER SCHWEIZ AG (CH)

( * ) Notice: Subject to any disclaimer, the term of this patent is extended or adjusted under 35 U.S.C. 154(b) by 27 days.

(21) Appl. No.: 14/912,704

(22) PCT Filed: Aug. 20, 2013

(86) PCT No.: PCT/EP2013/067312
§ 371 (c)(1),
(2) Date: Feb. 18, 2016

(87) PCT Pub. No.: WO2015/024592
PCT Pub. Date: Feb. 26, 2015

(65) Prior Publication Data
US 2016/0201834 A1 Jul. 14, 2016

(51) Int. Cl.
*F16L 33/025* (2006.01)
(52) U.S. Cl.
CPC .................. *F16L 33/025* (2013.01)
(58) Field of Classification Search
CPC ...................................................... F16L 33/025
See application file for complete search history.

(56) References Cited

U.S. PATENT DOCUMENTS

| 4,756,060 A * | 7/1988 | Ojima | F16L 33/035 24/20 CW |
| 6,560,824 B1 * | 5/2003 | Kitamura | F16L 33/025 24/20 CW |
| 8,230,556 B2 * | 7/2012 | Palau Dominguez | F16L 33/025 24/20 CW |
| 8,424,167 B2 * | 4/2013 | Meier | F16L 33/025 24/19 |
| 2014/0259547 A1 * | 9/2014 | Miessmer | F16L 33/025 24/268 |
| 2015/0267848 A1 * | 9/2015 | Zaharis | F16L 33/025 24/20 CW |
| 2016/0363145 A1 * | 12/2016 | De Vittorio | B65D 63/06 |

FOREIGN PATENT DOCUMENTS

| CH | 580779 A5 | 10/1976 |
| DE | 4029842 A1 | 4/1991 |
| DE | 60301343 T2 | 6/2006 |
| WO | 2013060346 A1 | 5/2013 |

OTHER PUBLICATIONS

Search Report and Written Opinion for International Patent Application No. PCT/EP2013/067312; dated May 8, 2014.

* cited by examiner

*Primary Examiner* — Robert Sandy
*Assistant Examiner* — Louis A Mercado
(74) *Attorney, Agent, or Firm* — Barnes & Thornburg LLP

(57) ABSTRACT

An open hose clamp having a clamping device, i.e., a so-called Oetiker ear. The clamped state is locked by serrated sections which engage with each other outside of the ear section on the side of the ear facing away from the outer clamp strip end. In the locked clamped state, the load on the ear is reduced so the hose clamp does not lose its clamping function even if the outward-protruding ear is damaged. The width of the clamping strip in the area of the ear is reduced compared to the remaining full clamping strip width.

5 Claims, 2 Drawing Sheets

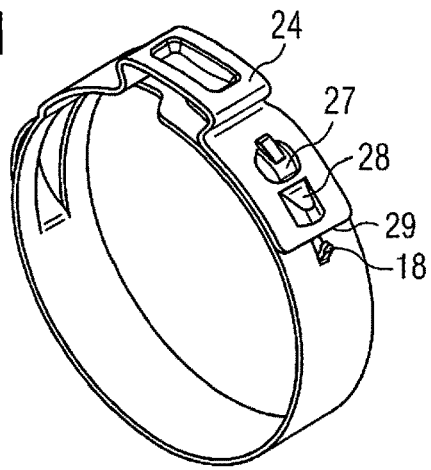
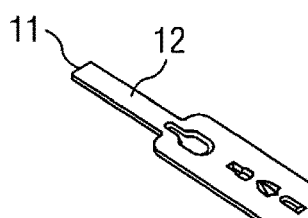
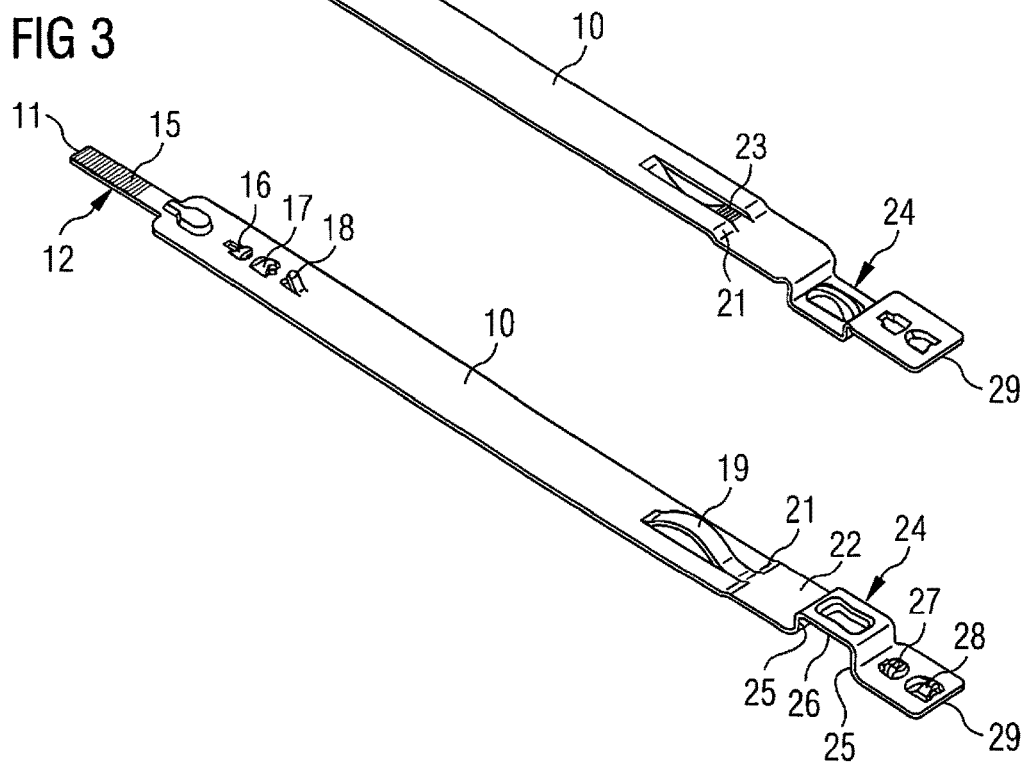
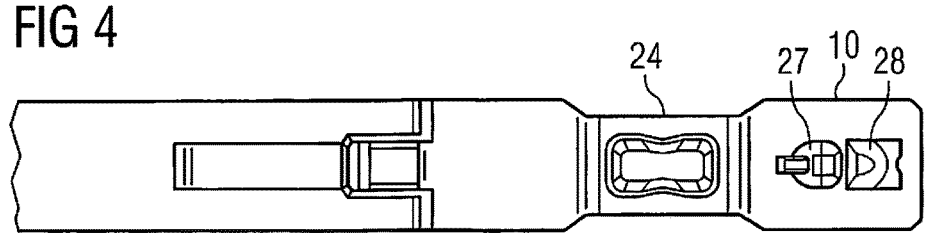

HOSE CLAMP

PRIORITY CLAIM

This patent application is a U.S. National Phase of International Patent Application No. PCT/EP2013/067312, filed 20 Aug. 2013, the disclosure of which is incorporated herein by reference in its entirety.

SUMMARY

Illustrative embodiments relate to a hose clamp. Most specifically, illustrative embodiments reduce the force required to tighten the clamp.

The reduction of the clamping band width in the area of the tightening device is made possible by the fact that the tightening device has to perform its function only during installation whereas, in the tightened condition, the holding forces are taken up by the toothed portions and the tightening device is relieved. Due to the reduced width in the area of the tightening device, the tightening process can be performed with a correspondingly smaller force. This allows the use of smaller installation tools.

At the same time, in maintaining the closing force, higher forces are exerted circumferentially thereby effectively increasing the radial forces relevant for the tightness of clamping, as compared to an ear clamp with no reduced clamping band width in the area of the ear.

The same tightening tool can be used for a plurality of hose clamps of different clamping band widths.

BRIEF DESCRIPTION OF THE DRAWINGS

A disclosed embodiment will be explained in more detail below with reference to the drawings, in which:

FIG. 1 is a perspective view of a hose clamp in the closed but not yet tightened condition;

FIGS. 2 and 3 are perspective representations of the hose clamp of FIG. 1 in the flat condition, viewed from what is, in the closed condition, the inner and, respectively, outer side of the clamping band; and FIG. 4 is an enlarged plan view of the outer band end of the hose clamp shown in FIG. 3.

DETAILED DESCRIPTION OF THE DISCLOSED EMBODIMENTS

Figure 5:
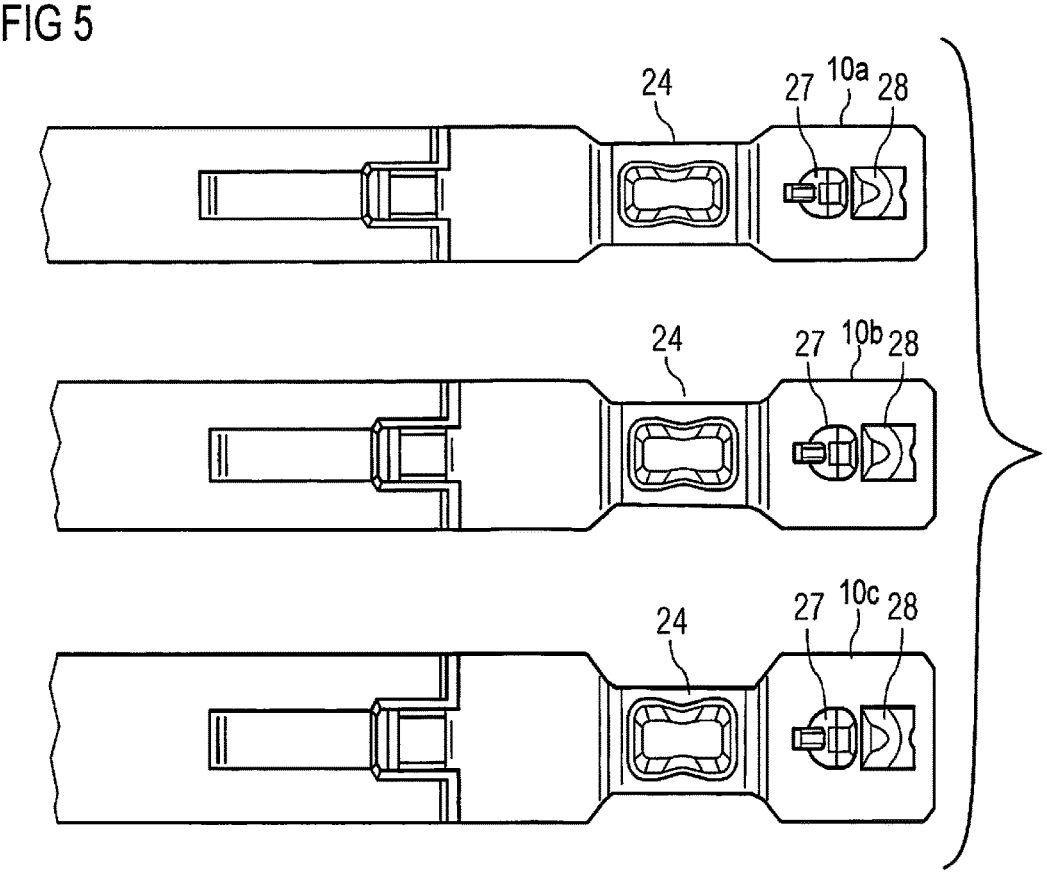
FIG. 5 provides a view of a set of three hose clamps in accordance with the disclosed embodiments.

The hose clamp shown in the drawing consists of a clamping band 10 which, starting from the end 11 at the upper left side in FIGS. 2 and 3, has the following elements: A tongue 12 having a width smaller than the full width of the clamping band 10, a first toothed section 15 formed on the tongue 12 and facing outward in the radial direction of the closed clamp, a projection forming a support hook 16, a guide hook 17, an integrated securing hook 18 against unintentional opening of the clamp, a cover portion 19 bent out of the clamping band, a raised portion 22 following a step 21, a second toothed section 23 facing inward in the radial direction of the closed clamp, a tightening device 24, i.e., a so-called "Oetiker ear" 24, having two legs 25 extending outward in the radial direction and interconnected by a web 26, a recess forming a support hook receiver 27, a guide hook receiver 28 and an outer clamping band end 29.

The support hook 16 is formed with a longitudinally extending guide web which is received in a longitudinally extending guide web receiver formed in the support hook receiver 27. This structure ensures that the tongue 12 is aligned with the second toothed section 23. Otherwise, there would be the risk that the tongue 12 does not centrically engage the second toothed section 23 during assembly.

The hose clamp, which is closed when delivered, is placed on the object to be clamped, which may be a pipe nipple surrounded by the end of a hose. The hose clamp is subsequently tightened by narrowing the ear 24 by means of an automatic or manual tightening tool such as a pair of pliers engaging both legs 25, whereby the two toothed sections 15 and 23 are brought into engagement. This engagement causes the hose clamp to be locked in the tightened condition in which the ear 24, which is now outside of the tightening area, is relieved. Even damage caused to the outward projecting ear has then no longer any essential influence on the holding function of the hose clamp.

From the closed condition of the hose clamp shown in FIG. 1, the tongue 12 moves during tightening process to the area under the cover portion 19 until the subsequent portion of full clamping band width is near the step 21. In this condition, the object to be clamped is surrounded by the full band width of the hose clamp without any steps or gaps substantially over its entire circumference.

As seen especially in FIG. 4, the width of the clamping band is reduced in the area of the ear 24 by at least 10 percent, optionally 20 percent, compared to the full band width. Although the reduction of the band width causes a weakening it is permissible because, as explained above, the ear is basically relieved in the installed condition in which it is finally used. On the other hand, the reduction of the band width means that a smaller force is sufficient for tightening the clamp and achieving a predetermined diameter reduction, e.g. by means of a plier-type tool engaging the legs of the ear, as compared to clamps having a constant clamping band width throughout.

Typical clamping band widths are 12 mm, 14 mm and 16 mm. If in all such hose clamps the band width in the area of the ear is made 12 mm the same tightening tool can be used for all hose clamps as understood with reference to FIG. 5.

An open hose clamp which has the features recited in the preamble part of claim 1 is known from WO 2013/060346 A1. In the known clamp, the inner end section of the clamping band has on its outer side a first toothed section which, in the tightened condition der hose clamp, engages in a second toothed section formed on the inner side of the outer end section at the side of an ear-type tightening device remote from the outer clamping band end. The ear-type tightening device only serves to tighten the hose clamp during installation, which may be done automatically or manually by means of a plier-type tool common with ear clamps. In the mounted condition, the holding forces produced during tightening are taken up by mutually engaging toothed portions while the ear is relieved. Since the toothed portions, which effect a locking, are arranged outside of the ear region the installed hose clamp can safely fulfil its function even when the outward projecting ear is damaged.

REFERENCE NUMBERS

10 clamping band
11 inner clamping band end
12 tongue
15 first toothed section
16 support hook
17 guide hook
18 securing hook 19 cover portion
21 step
22 raised portion
23 second toothed section
24 ear
25 leg
26 web
27 support hook receiver
28 guide hook receiver
29 outer clamping band end

The invention claimed is:

1. A hose clamp comprising;
a clamping band having an inner end section overlapped by an outer end section;
a closure device which, in a closed condition of the hose clamp, holds both end sections in mutual engagement;
an ear-type tightening device provided in the clamping band and having two outward projecting legs interconnected by a web; and
a retaining device which, in a tightened condition of the hose clamp, retains an inner end section of the clamping band in engagement with an outer end section on a side of the tightening device remote from the outer end of the clamping band,
wherein a longitudinal side edge of the clamping band is of a uniform thickness extending an entire length of the clamping band, and
wherein a total width of the clamping band in an area of the ear-type tightening device is smaller than a width of the clamping band elsewhere.

2. The hose clamp of claim 1, wherein, in the area of the tightening device, the width of the clamping band is reduced by at least 10 percent as compared to a full band width of the clamping band.

3. The hose clamp of claim 1, wherein the retaining device has a first toothed section provided on an outer side of the inner end section of the clamping band and a second toothed section provided on an inner side of the outer end section on the side of the tightening device remote from the outer end of the clamping band and engaging the first toothed section in the tightened condition of the hose clamp.

4. A set of a plurality of hose clamps in accordance with claim 1, wherein a plurality of clamping bands of at least two hose clamps have different widths but the total width in the area of the tightening device is the same in all of the hose clamps.

5. The set of claim 4, further comprising hose clamps, the clamping bands of which have widths of 12 mm, 14 mm and 16 mm.

* * * * *